United States Patent
Romca et al.

(10) Patent No.: US 6,578,795 B2
(45) Date of Patent: Jun. 17, 2003

(54) PASSENGER ORIENTATION ARRANGEMENT IN A PASSENGER CABIN

(75) Inventors: Jens Romca, Kiel (DE); Jochen Mueller, Kiel (DE); Markus Schumacher, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/804,582

(22) Filed: Mar. 9, 2001

(65) Prior Publication Data

US 2001/0023908 A1 Sep. 27, 2001

(30) Foreign Application Priority Data

Mar. 9, 2000 (DE) .......................... 100 11 431
Oct. 24, 2000 (DE) .......................... 100 52 594

(51) Int. Cl.$^7$ .............................. B64D 11/06
(52) U.S. Cl. ............... 244/122 R; 244/118.5; 244/118.6; 40/320; 116/209
(58) Field of Search ............... 244/122 R, 118.5, 244/118.6, 129.1, 137.2, 137.1; 362/471, 470; 116/28 R, 209; 40/584, 585, 618, 124.02, 1, 320; 246/122 R; 105/345, 344; 297/463.2

(56) References Cited

U.S. PATENT DOCUMENTS 3,116,090 A * 12/1963 Kornbluth .................. 297/217
3,283,433 A * 11/1966 Navarino ..................... 40/320
4,029,994 A *  6/1977 Iwans ......................... 315/323
5,984,415 A * 11/1999 Schumacher et al. .... 297/411.2
6,070,347 A *  6/2000 Hergott ....................... 40/320
6,276,634 B1 *  8/2001 Bodle ....................... 244/118.5

OTHER PUBLICATIONS http://usairways.com/about/aircraft/767/index.htm.*

* cited by examiner

Primary Examiner—Charles T. Jordan
Assistant Examiner—Gabriel S. Sukman
(74) Attorney, Agent, or Firm—W. F. Fasse; W. G. Fasse (57) ABSTRACT

A seating space such as an aircraft passenger cabin has rows of seats along an aisle, identified by a row number and a seat location letter. A seat row indicator is arranged on the side flank of the seat back of each aisle seat, at the corner where the side flank and upper edge of the seat back meet. A seat location indicator is arranged at the middle of the upper edge of the seat back of each seat. The row numbers and seat letters are indicated on or in the indicators by paint, printing, engraving, inserts, illumination or tactile indicia. The indicators are conspicuous and easily visible to a passenger standing or walking in the aisle without bending or leaning over. Boarding of the aircraft is facilitated and expedited. Emergency evacuation is assisted by appropriate illumination of the indicators.

19 Claims, 4 Drawing Sheets

PASSENGER ORIENTATION ARRANGEMENT IN A PASSENGER CABIN

PRIORITY CLAIM

This application is based on and claims the priority under 35 U.S.C. §119 of German Patent Applications 100 11 431.8, filed on Mar. 9, 2000 and 100 52 594.6, filed on Oct. 24, 2000, the entire disclosures of which are incorporated herein by reference.

FIELD OF THE INVENTION

The invention relates to an arrangement of indicator devices for passenger orientation in a passenger cabin of a passenger aircraft or other passenger transport vehicle such as a train, ship, or bus or the like. Particularly, the indicator elements of the passenger orientation arrangement indicate the seat row number as well as the seat location identification of each passenger seat.

BACKGROUND INFORMATION

Arrangements of indicator elements for the orientation of passengers are typically known in present day aircraft. For example, in the Airbus A320 aircraft, and many other present day aircraft, the indicator elements that indicate the seat row number and the seat location identification (e.g. seat letter) are rod-shaped or linear indicator elements that extend perpendicularly to the flight direction or longitudinal axis of the aircraft, i.e. parallel to the direction of extension of the seat row. Particularly, these indicator elements are conventionally integrated into a passenger service unit (PSU) channel on the underside of the overhead baggage compartments.

For ergonomic reasons, the installation height of the passenger service unit (PSU) channel is limited to be within the comfortable reach of typical seated passengers, e.g. for conveniently reaching air outlets, reading lights, or the like in the passenger service units. Furthermore, the arrangement of fixed, non-lowerable overhead baggage compartments must comply with a prescribed height of the loading edge of the baggage compartment, which is approximately 1.67 meters above the cabin floor, for ergonomic reasons. Due to the convex curved contour of the bottom side of the baggage compartment in aircraft such as the Airbus A320 (see e.g. FIG. 1 of the present application), the conventional indicator element showing the row number and seat location is arranged significantly lower than the loading edge of the baggage compartment.

As a result of such an arrangement, the row number and seat location indicator elements are rather difficult or impossible for a person of typical stature to see while standing in the aisle, thus requiring the person to bend down or lean over while attempting to see the indicator elements. Also, if the boarding passenger is not familiar with the location of the indicator elements and therefore does not know where to look to find his or her seat location, the conventional arrangement of the indicator elements does not readily attract the passenger's attention, i.e. is not conspicuous and readily evident to the passenger.

In view of the above, conventional arrangements of passenger orientation indicator elements contribute to significant delays during passenger boarding, because it is rather difficult for each passengers to each find the respective correct seat row and seat location within the row that has been assigned to this respective passenger. Namely, the passengers often stop or walk slowly along the aisle while trying to find the correct seat, thereby delaying the following passengers. Also, if a passenger sits in an incorrect seat, an additional delay is caused when the passenger who was assigned to that seat arrives and wishes to sit there. The amount of time required for passenger boarding is thereby increased, and disadvantageously adds to the total ground time required for the turn-around of the aircraft, which is a significant factor in determining the economics of operating the aircraft.

SUMMARY OF THE INVENTION

In view of the above, it is an object of the invention to provide a passenger orientation arrangement in a passenger cabin of a transport vehicle and particularly an aircraft, which makes it easier for passengers to see and find the seat row numbers and seat location identifiers during boarding of the aircraft or at any time when they are moving through the passenger cabin. It is a further object of the invention to make the boarding of an aircraft more comfortable and convenient for the passengers, while speeding-up the boarding process, so as to thereby improve the economy of operation of the aircraft by reducing the ground time. The invention further aims to avoid or overcome the disadvantages of the prior art, and to achieve additional advantages, as apparent from the present specification.

The above objects have been achieved in an improved passenger orientation arrangement in a passenger cabin of a passenger transport vehicle, or more generally in any seating area equipped with rows of plural seats for the seating of persons thereon. The inventive orientation arrangement includes indicator elements that indicate the seat row number and the seat location identification (e.g. seat letter) respectively of the plural seats in a seating configuration in the passenger cabin. The indicator elements indicate the corresponding seat row and the corresponding seat location or position of a seat within a given seat row. Particularly according to the invention, the indicator elements are arranged on the passenger seats themselves, at one or more locations that are visible to a passenger, especially while walking along an aisle of the passenger cabin.

At least one indicator element showing the seat row, e.g. the seat row number, is arranged on the side flank of the seat back of an aisle seat, i.e. a passenger seat that is located directly adjacent to the aisle. Preferably, this seat row indicator element is arranged at the corner of the seat back side flank meeting the seat back upper edge of the aisle seat, and is preferably embodied as a corner cap. An additional indicator element showing the particular seat location or seat position (e.g. seat A, B, C, or the like) within a given row is provided on the seat back upper edge of each seat.

With the inventive passenger orientation arrangement, it is especially advantageous that the boarding time required by the passengers to board the aircraft is reduced and the boarding process is made more convenient and comfortable, because the identification of each seat row and each seat location within the row is arranged so that it is easily visible for a passenger of ordinary stature who is walking or standing in the aisle, without requiring the passenger to bend down or lean over or otherwise change his normal walking or standing posture, and without requiring the passenger to exert an effort for a difficult search for the seat identification indicia. Instead, according to the invention, the seat identification is conspicuous, readily visible, and easily readable.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
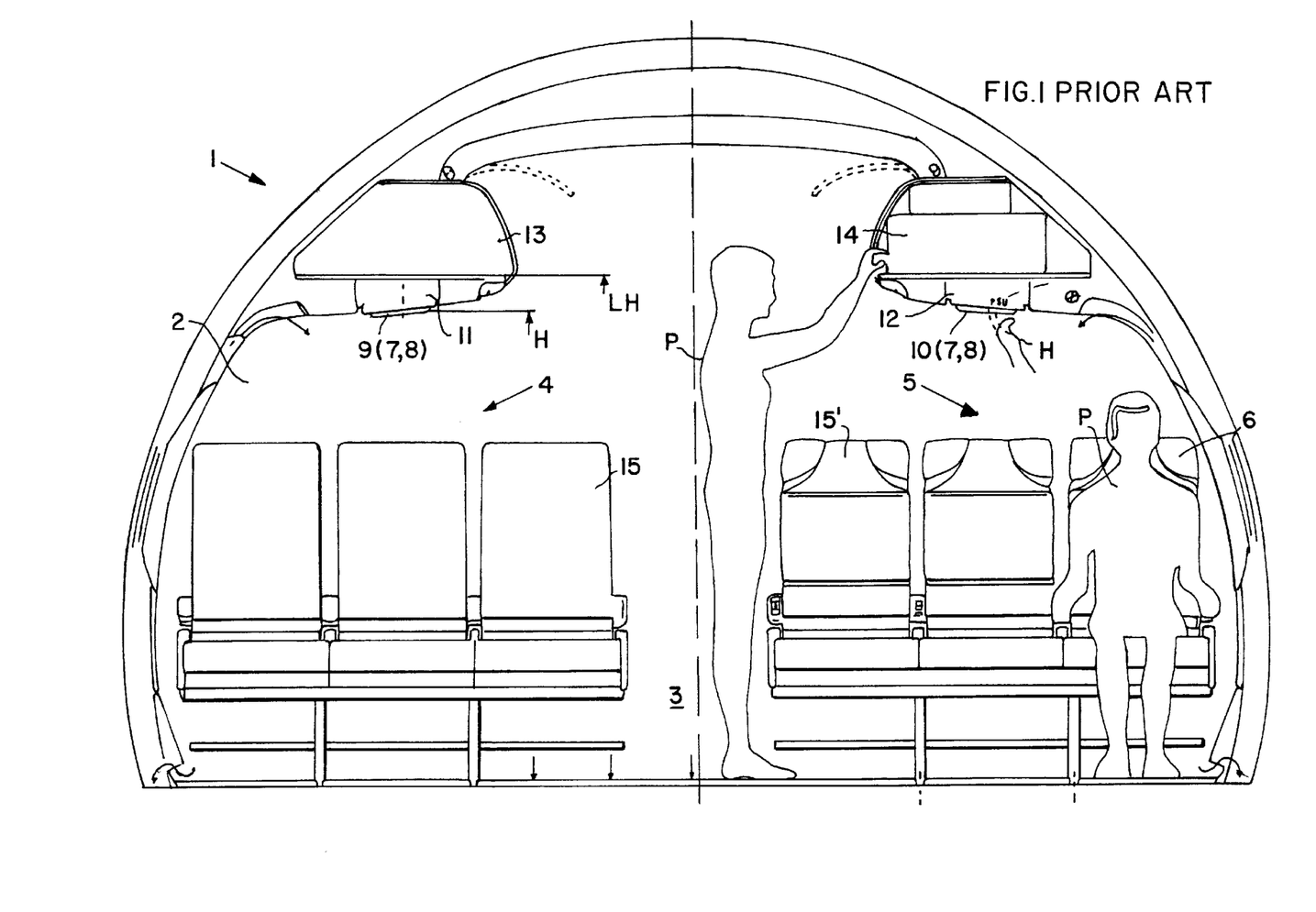
FIG. 1 shows a schematic cross-section through an aircraft fuselage equipped with a conventional arrangement of indicator elements for identifying the seat row numbers and seat locations.

FIG. 1 schematically shows a cross-section through an aircraft fuselage 1 of an aircraft of the Airbus A320 type, with a passenger cabin 2 configured and equipped for passenger transport. Representative typical passengers P are shown standing and sitting in the passenger cabin 2. The passenger cabin 2 is equipped with seat groups 4 and 5 arranged successively one after another along opposite sides of a central aisle 3 that runs along the aircraft longitudinal direction. The seat groups 4 and 5 respectively on opposite sides of the aisle 3 together form a respective seat row 6. A number of such seat rows 6, i.e. a number of the seat groups 4 and 5, are arranged successively one after another in the aircraft longitudinal direction.

For the purpose of providing individual seat assignments for the individual passengers, each seat row 6 is typically identified by a seat row identifier 7 and particularly a row number, and each individual seat is additionally identified by a seat location identifier 8 within the given row. The seat location is typically identified by a letter, e.g. A, B, C, etc. Alternatively, the seat rows could be identified by letters, and the seat locations could be identified by numbers, or the rows and locations could be identified by any other convenient indicia. This specification will adhere to the typical use of seat row numbers and seat location letters as a convenient example.

For the sake of orientation of a passenger who is boarding the aircraft, and to enable the passenger to find his or her assigned seat, the conventional cabin arrangement shown in FIG. 1 provides a single indicator element 9 for the seat group 4 and a single indicator element 10 for the seat group 5, whereby each one of these indicator elements 9 and 10 respectively indicates the seat row number 7 and the seat location identifier 8 (e.g. by location letters A to F). In the conventional passenger orientation arrangement, these indicator elements 9 and 10 are arranged above the seat groups 4 and 5, and particularly are integrated into a respective corresponding left or right passenger service unit (PSU) channel 11 and 12 provided on the bottom side of the overhead baggage compartments 13 and 14. The indicator elements 9 and 10 are each respectively a generally rod-shaped or linearly extending element that extends perpendicularly to the longitudinal direction of the aircraft and parallel to the respective row of seats.

As generally discussed above, the passenger service unit channels 11 and 12 are arranged at a proper height within the cabin 2, so that they are within the ordinary reach of a seated passenger P, as indicated by the schematically drawn passenger's hand H. Due to the prescribed loading edge height LH of the baggage compartments 13 and 14, and the lower height H of the indicator elements 9 and 10, relative to the cabin floor, these indicator elements 9 and 10 are not easily visible to a passenger P who is standing or walking in the aisle 3, for example along a line of sight extending from a point 1.67 m above the centerline of the aisle 3. Thus, in connection with this conventional arrangement, it is necessary for the standing or walking passenger P to bend down or lean over in order to see the seat row numbers 7 and seat location identifications 8, which thereby slows down the progress of the passenger P along the aisle 3 and prevents a smooth and rapid boarding by all of the passengers.

To solve the above described problem associated with the conventional arrangement shown in FIG. 1, the invention proposes to provide a conspicuous, easily visible, and easily readable identification of the seat row number and the seat location on the relevant object itself, namely directly on the passenger seat or the passenger seat groups 4 and 5. This makes sense from an ergonomic standpoint as well as from a psychological standpoint. Namely, the spatial orientation of a person while searching for an object (i.e. in this case the respective assigned seat), generally involves first locating and arriving at an approximate position in the vicinity of the target object, and then closing in on a more exact position once the general vicinity of the target object has been identified and reached. This is especially true in situations with poor oversight and particularly when the intended target object being sought is not directly visible from the starting point. This applies to the boarding of an aircraft, because a respective assigned seat is generally not visible from the point of first boarding the aircraft cabin at a door of the aircraft, for example due to cabin dividers or the like in the aircraft, or especially also due to the other passengers who have already boarded the aircraft and are looking for their respective seats.

While boarding the aircraft and searching for his or her exact assigned seat, a passenger will first begin a coarser or more general search and orientation based on the general location of the assigned seat row. The passenger will read the assigned seat row and location from his or her boarding pass, then determine the seating row at which he is presently located to determine how close or how far from the target row he is located. While walking along the aisle 3, the passenger P must also determine the progression of the seat row numbers 7, i.e. in which direction and in what sequence or pattern the seat row numbers increase or decrease. Thereby, the passenger P will be oriented to continue the search until he has arrived at the assigned seat row number 7. Once he has arrived at the assigned seat row, the passenger must further determine the particular seat location 8 that has been assigned to him within that row.

For the above reason, the invention provides that the identification of the seat row 7 is arranged so that it is conspicuous, readily visible, and easily readable by a passenger P who is standing or walking in the aisle 3, without changing his normal posture. It is more important for the identification of the seat row to be conspicuous (in comparison to the identification of the seat location within a given row), in view of the above discussed coarse-then-fine searching procedure. Particularly, for this reason, the invention provides that the identification of the seat rows is arranged on the aisle-facing side of the aisle seats 15 and 15' of the seat groups 4 and 5. The identification may be provided on either one or both of the aisle seats 15 and 15' in each seat row. Also, the identification of the row, e.g. the row numbers, may be larger than the identification of the seat location, e.g. the seat letters, to be visible from a greater distance.

Figure 2:
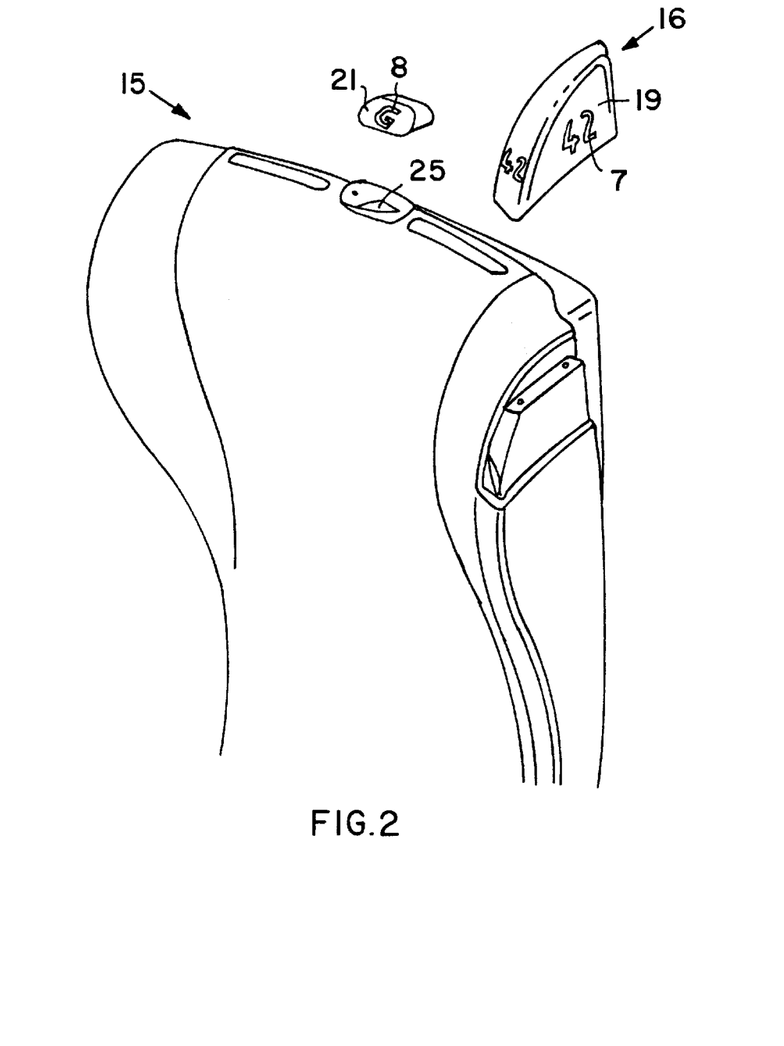
FIG. 2 is a schematic perspective view of a passenger seat equipped with a passenger orientation arrangement with indicator elements for identifying the seat row number and the seat location, according to the invention.

FIG. 2 schematically and perspectively shows a portion of the aisle seat 15 (or equivalently the mirror-symmetrical aisle seat 15') of the seat group 4 or 5. It should be understood throughout this description, that the special passenger orientation arrangement, and particularly the passenger seats shown in FIGS. 2 to 6, can be arranged in an otherwise conventional passenger cabin 2 in an aircraft fuselage 1 as shown in FIG. 1. Alternatively, the inventive arrangement can be provided in connection with passenger seats in a passenger cabin of other passenger transport vehicles, such as trains, ships, buses or the like. As a further alternative, the inventive arrangement can be provided in connection with seats in any other type of seating space in which a plurality of seats are arranged in rows along an aisle, such as movie theaters, stage theaters, auditoriums, sports arenas, and the like. Nonetheless, the invention is especially directed to such an inventive arrangement in a passenger cabin of a passenger transport vehicle and particularly a passenger aircraft, because of the special problems associated with the orderly boarding of a great number of passengers at essentially one time, in the quickest manner possible so as to minimize the time required for boarding and the total ground time of the aircraft.

According to the invention as shown in FIG. 2, the aisle seat 15 or 15' of the seat group 4 or 5 is equipped with a seat row indicator 16 which shows or indicates the respective corresponding seat row number of the associated seat row. The respective seat row number 7 (which is row number 42 in the illustrated example) is printed or painted or otherwise applied onto or into the seat row indicator 16, or molded as a surface protrusion or indentation into the seat row indicator 16, or indicated by appropriate illumination from within the seat row indicator 16. Additionally, the seat row indicator 16 may include tactile indicia of the seat row number 7, either by a raised or indented representation of the seat row number in arabic numerals, or by corresponding Braille indicia or the like.

The seat row indicator 16 shall be located so that it is unobstructed and readily visible (and also readily touchable for tactile reading of Braille indicia or the like) by a passenger in the aisle 3, even when another passenger is seated in the seat on which the indicator 16 is mounted, as apparent from the drawing figures. For this reason, the seat row indicator 16 is arranged at the greatest possible height in the corner area where the seat back upper edge 17 and the seat back side flank 18 meet each other, on the side of the aisle seat 15 facing toward the aisle 3. An aisle seat is understood to be a seat directly bordering on the aisle. In this context, the seat back upper edge 17 of the aisle seat 15 is typically located at a height between 1.10 m and 1.15 m above the cabin floor, so that the seat row indicator 16 arranged at the above mentioned corner is directly below the ordinary point of view or line of sight of a standing adult person of typical stature. Thus, the seat row indicator 16 is easily visible to a passenger P standing in the aisle 3, with a normal posture of his head, i.e. without bending or leaning. As can be understood from FIGS. 2, 3, 4 and 6, the seat row indicator 16 is configured and arranged to be integrated smoothly and flushly into the contour of the seat in the corner area where the seat back upper edge 17 and the seat back side flank 18 meet each other.

The seat row indicator 16 is preferably embodied as a corner cap 19, for example molded of plastic or the like. The seat row number 7 is provided on this corner cap 19 at least two times in two different locations, in order to facilitate the visibility and the readability of the seat row number 7, not only from a boarding direction, but from essentially all directions or at least 180° around the corner cap 19. The embodiment in FIGS. 2 and 3 includes a three-fold numbering, i.e. the seat row number 7 is provided on a forward-facing surface, a laterally-facing or aisle-facing surface, and a rearward-facing surface of the corner cap 19.

As an alternative, which is not illustrated, the corner cap 19 includes two surfaces that face diagonally toward the front and diagonally toward the rear in a triangular protruding arrangement, whereby the seat row number 7 is provided only twice on the corner cap 19, namely once on each diagonally extending surface of the corner cap 19. With such a diagonal facing orientation of the seat row numbers 7, a third seat row number 7 would be redundant and unnecessary, because the two provided seat row numbers can readily be seen and read from the front, the rear, and the aisle side.

Figure 3:
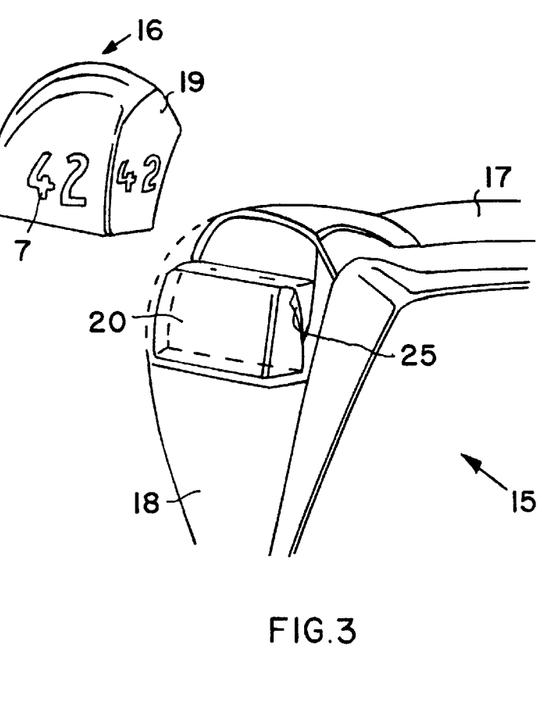
FIG. 3 is a perspective detail view of a portion of the arrangement shown in FIG. 2, in the area of the side flank of an aisle seat, shown in a view direction from behind.

FIG. 3 shows a detail of the corner cap 19 in a disassembled or exploded condition, in a view direction onto the rear part of the aisle seat 15 (while FIG. 2 perspectively shows the front of the aisle seat 15). For mounting the corner cap 19, a mounting element 20 is rigidly and permanently secured in the corner area of the seat between the seat back upper edge 17 and the seat back side flank 18 of the aisle seat 15. In this context, "permanently" secured means that the mounting element 20 is intended to remain permanently associated with this particular seat 15, even if the seat 15 is moved to a different location within the passenger cabin 2 or replaced or the like. This applies even though the mounting element may be secured with screws or the like which could be removable. The "permanence" of the mounting element 20 is relative to the exchangeability of the corner cap 19. Namely, the corner cap 19 is mounted on the mounting element 20, for example by means of a plug-in connection established by plug-in pins or catch pins in any conventionally known manner. Preferably, this connection of the corner cap 19 onto the mounting element 20 is a selectively releasable connection, so that the corner cap 19 may be exchanged or replaced.

For example, when the seating layout in the passenger cabin 2 is to be altered, or if it is necessary to replace the respective seat 15, then it may become necessary to change the seat row number 7 associated with this seat. Moreover, to satisfy the needs of different airlines, or to allow changing decor schemes over time, it may be desired to replace the corner caps 19 with different corner caps 19 having different configurations or colors or the like. Also, it is advantageous to enable the replacement, with as little effort and expense as possible, of a respective corner cap 19 that has become damaged. Such exchange or replacement of the corner caps 19 is facilitated by the releasable mounting thereof onto the mounting elements 20.

FIG. 2 further shows that each respective seat (not only the aisle seats 15) of a seat group 4 or 5 is further provided with a seat location indicator 21, which shows or indicates a seat location identification 8, such as a seat letter A, B, C or the like, to identify the particular seat within the row (the illustrated example shows seat G in row 42). The seat location indicator 21 is arranged in the area of the seat back upper edge 17, and preferably directly at the middle on the seat back upper edge 17, 50 as to protrude smoothly upwardly from the seat back upper edge 17 as shown in FIGS. 2, 4, 5A, 5B, and 6. By identifying the seat location 8, e.g. by the seat letter A, B, C, etc., directly on the seat itself in a visible location thereof, the indicator 21 assists the passenger P in rapidly finding his assigned seat, whereby the entire boarding procedure may be accelerated. Braille or other tactile indicia provided on the indicator 21 are also readily accessible to the touch of the passenger. The indicator 21 remains visible and unobstructed to be seen from the aisle, even when a passenger is seated in the respective seat, as apparent from the drawing figures.

Figure 4:
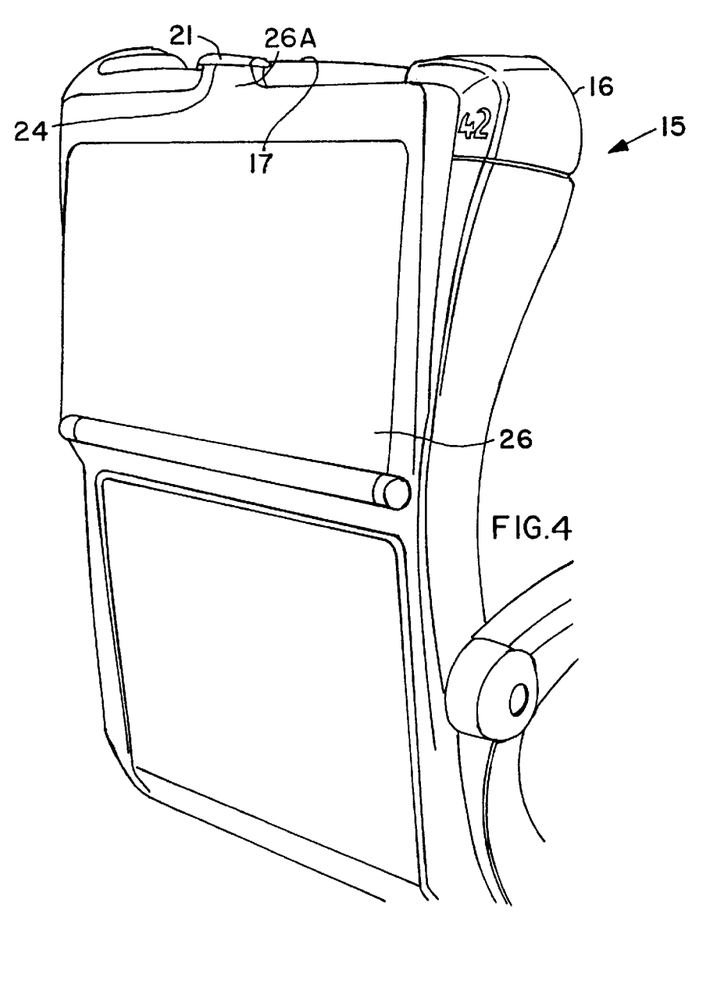
FIG. 4 is a schematic perspective view of a seat back equipped with a seat row indicator and a seat location indicator according to the invention.
Figure 5A:
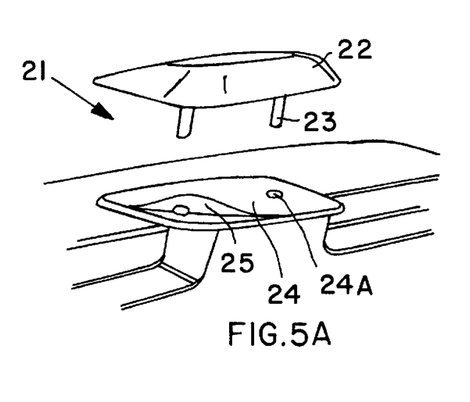
FIG. 5A is a detail view of a portion of the seat shown in FIG. 4, with the seat location indicator partially disassembled or exploded for clarification.
Figure 5B:
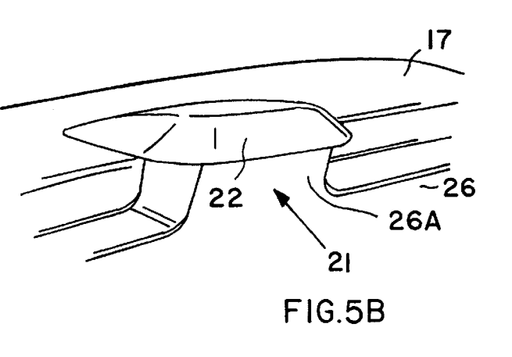
FIG. 5B shows the seat location indicator of FIG. 5A in the assembled condition.

FIGS. 4, 5A and 5B show another detail of the seat location indicator 21 as seen from the back side of the seat 15, which is further equipped with a passenger tray table 26. The seat location indicator 21 comprises an identification cap 22 having protruding catch pins 23 that are inserted and engaged into correspondingly provided catch holes 24A of a mounting base 24 arranged on the seat back upper edge 17 of the seat back of the seat 15. The seat location identification 8, typically in the form of letters A, B, C, etc., can be provided on or in the identification cap 22 in any conventionally known manner, such as being printed or painted onto the outer surface of the identification cap 22, or printed or painted into the inner surface, or provided on a separate insert that is inserted into the identification cap 22.

In any arrangement in which the seat location identification 8 is provided on the inside of the identification cap 22, the cap 22 itself must be clear or transparent to allow the respective indicia to be seen. Furthermore, the identification cap 22 may be provided with tactile indicia such as Braille indicia on the outer surface thereof. The location of the identification cap 22 at the center of the seat back upper edge 17 of each seat makes the respective seat location indicia clearly visible and also clearly reachable for tactile reading of Braille indicia or the like.

A further embodiment of the present orientation arrangement makes use of the fact that modern aircraft passenger cabins are outfitted and equipped so as to be able to provide electrical power to each passenger seat. Thus, each one of the indicators according to the invention, i.e. both the seat row indicators 16 and the seat location indicators 21, can be embodied to be illuminated for indicating the seat row and seat location. For example, this may be achieved by providing an electroluminescent film 25 within the seat location indicator 21 as shown in FIG. 5A, or within the seat row indicator 16. The electroluminescent film 25 is connected to an appropriate electrical supply conductor, so that the film 25 illuminates the respective indicator, whereby the row number or seat letter can then be concretely realized by a corresponding masking arrangement of the corner cap 19 or the identification cap 22, e.g. so that the respective number or letter appears as an illuminated indicia in a dark background or vice versa. This illumination is provided especially during the boarding phase, and may be extinguished after the boarding has been completed.

Instead of using an electroluminescent film 25, an illumination according to the invention can be achieved with any conventionally known illumination devices, i.e. any light emitting device (which is used as a general term applying to any device that emits light) for backlighting an indicator, for example using light emitting diodes, liquid crystal displays, optical fibers conveying light from a centralized or remote light source, or printing an electroluminescent material in the form of the appropriate number or letter directly onto the inner surface of the corner cap 19 or the identification cap 22 and then connecting an electrical supply conductor to the electroluminescent material.

In addition to being illuminated during the boarding phase, the seat row indicators 16 or also the seat location indicators 21 may be illuminated during an emergency evacuation procedure in order to assist passengers in exiting from the passenger cabin 2 in an orderly and guided manner. For example, the indicators 16 and optionally also 21 may be illuminated together with the escape path illumination provided in the passenger cabin 2 and especially along the aisle 3. In the event that the rest of the cabin is dark, the illuminated seat row indicators 16 provided on the side flanks of the seat backs provide visual guidance for the passengers to recognize the lateral boundaries and contour of the space of the aisle 3 bordered by the side flanks 18 of the aisle seats 15 and 15', in addition to recognizing the escape path illuminated along the floor of the aisle. Thereby, the illuminated seat row indicators 16 help to prevent passengers from becoming caught against the side flanks of the aisle seats while trying to evacuate along the aisle 3, and help to expedite the smooth and orderly evacuation process.

Furthermore, the seat row indicator 16 of any escape or exit row, for example a row provided with or adjacent to an exit door or exit hatch, may be illuminated with a different particularly conspicuous color, e.g. bright red. Similarly, the seat location indicators 21 of the seats in an exit row may be illuminated bright red during an emergency situation, while the seat location indicators 21 of other seat rows are not illuminated or e.g. illuminated in white during an emergency situation. With the above described lighting pattern provided by the inventive indicators 16 and 21 according to the invention, in addition to the conventionally existing emergency lighting, the evacuating passengers are oriented and guided in three dimensions directly to the emergency exit locations, especially if the cabin is otherwise dark.

When viewing FIG. 4, FIG. 5A and FIG. 5B together, it is apparent that the seat location indicator 21 arranged on the seat back upper edge 17 additionally may provide the function of a securing catch for securing, into an upright position, the passenger tray table 26 provided on the back side of the seat back. Namely, the tray table 26 includes a protruding catch nose or protrusion 26A that can be snapped under and thus engaged by the seat location indicator 21. Particularly, any suitable catch element for engaging the protrusion 26A of the tray table 26 may be provided on the mounting base 24 of the seat location indicator 21.

Figure 6:
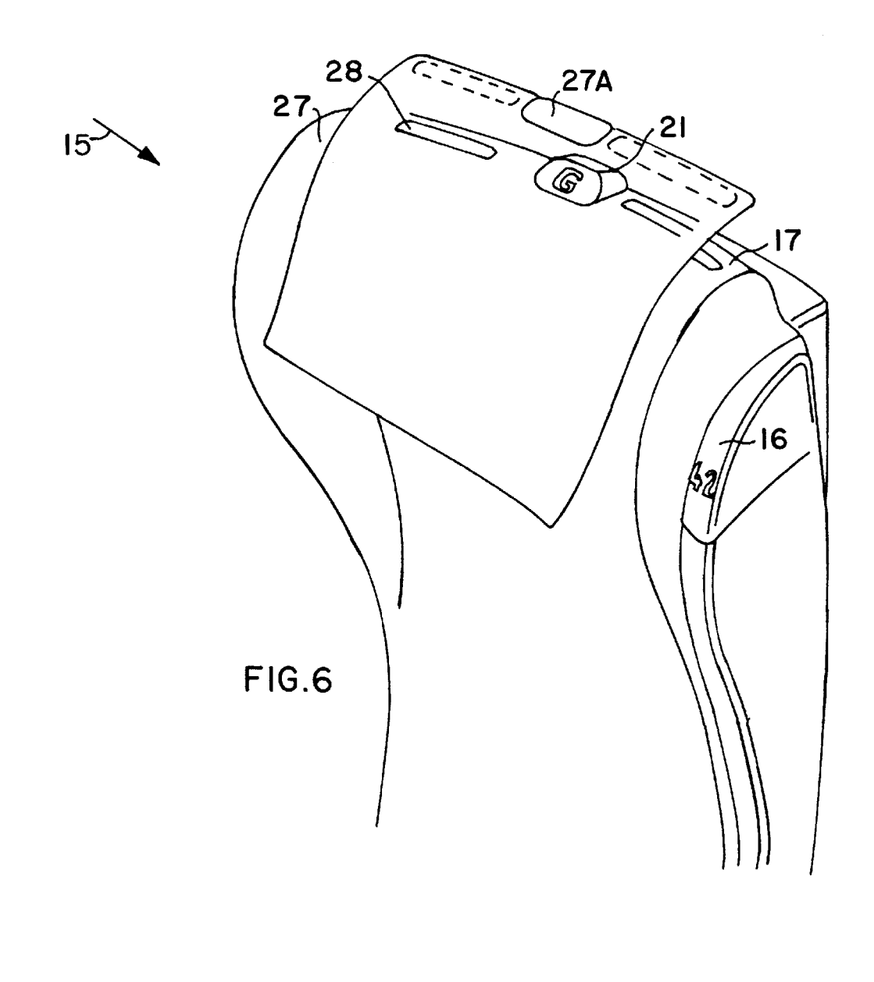
FIG. 6 is a schematic perspective view of a passenger seat equipped with a seat location indicator in combination with a protective cover for a head cushion of the seat.

FIG. 6 shows a further passenger seat with the seat location indicator 21 providing an additional function. For hygienic reasons, many airlines typically provide covers over the head cushions of the seat backs and exchange these head cushion covers regularly, e.g. during each cabin cleaning between flights. Exchanging or replacing the head cushion covers in this manner requires a significant amount of time during the cabin cleaning operation, and thus increases the total ground time of the aircraft. This is especially true when the head cushion cover is in the form of a sleeve or like a pillow case that is pulled over the top of the seat back. Instead of pulling such a cover or case over the entire head cushion, the present inventive arrangement provides an appropriately formatted head cushion cover 27 in the form of a flat sheet that is laid over the head cushion.

In order to easily locate and secure the head cushion cover 27 at the proper location, the cover 27 is provided with a hole 27A configured and dimensioned to fit directly over the seat location indicator 21. Thereby, the head cushion cover 27 is simply positioned with its hole 27A located securely around the seat location indicator 21, which thereby holds the cover 27 in place. Additionally, strips of hook and loop fastener material 28 may be provided along the seat back upper edge 17 and along the back margin of the head cushion protective cover 27, to achieve an additional uniform securing of the head cushion protective cover 27 onto the seat back upper edge 17. The removal and replacement of the head cushion protective covers 27 with such an embodiment is significantly quicker in comparison to the conventionally typical tensioned covers for the head cushions.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a seating area including an aisle, plural seats including aisle seats that are arranged one after another in successive rows along said aisle and that are adapted for a person to sit thereon, and a seat identification arrangement that respectively identifies at least a respective row identifier of each one of said successive rows of said seats, wherein each one of said seats respectively includes a seat back bounded by a seat back upper edge and two seat back side flanks, an improvement in said seat identification arrangement comprising:

seat row indicators that respectively indicate a respective row identifier of each respective one of said successive rows of said seats; and seat location indicators that respectively indicate a respective seat location identifier of each respective one of said seats in a respective one of said rows;

wherein said seat row indicators are respectively arranged on respective ones of said seat back side flanks of said aisle seats that face said aisle;

wherein said seat row indicators respectively include light emitting elements that selectively illuminate said seat row indicators;

wherein said seating area further includes an emergency evacuation lighting system including escape path lights along said aisle; and wherein said light emitting elements of said seat row indicators are connected to said emergency evacuation lighting system so as to be illuminated together with said escape path lights.

2. The improvement in the seat identification arrangement according to claim 1, wherein said seating area includes at least one emergency exit, wherein at least one of said rows of said seats is an emergency exit row adjacent to said emergency exit, wherein said seat location indicators of said seats in said emergency exit row include light emitting elements that selectively illuminate said seat location indicators of said seats in said emergency exit row, and wherein said light emitting elements of said seat location indicators are connected to said emergency evacuation lighting system so as to be illuminated together with said escape path lights.

3. The improvement in the seat identification arrangement according to claim 2, wherein said seat location indicators of said seats that are not in said emergency exit row include light emitting elements that selectively illuminate said seat location indicators of said seats that are not in said emergency exit row with a different color relative to said seat location indicators of said seats that are in said emergency exit row.

4. A passenger seating arrangement in a passenger seating cabin of an aircraft, comprising:

an aisle in said cabin;

plural passenger seats arranged side-by-side next to one another on a respective side of said aisle, respectively in each one of plural successive rows of said seats along said aisle, wherein said seats in each one of said rows respectively include at least one aisle seat that is adjacent to said aisle, and wherein each one of said seats respectively includes a seat back bounded by a seat back upper edge and two seat back side flanks;

seat row indicators that respectively indicate a respective row identifier of each respective one of said successive rows of said seats, and that are each respectively arranged on a respective one of said seat back side flanks of said aisle seats that face said aisle; and seat location indicators that respectively indicate a respective seat location identifier of each respective one of said seats in a respective one of said rows, and that are each respectively arranged directly on a respective one of said seats;

wherein said seat row indicators and said seat location indicators are positioned so that said seat row indicator and said seat location indicators arranged on said seats of any respective one of said rows are directly visible and unobstructed in a direct line of sight of a person standing or walking in said aisle adjacent to said respective one of said rows of said seats, both when said seats of said respective one of said rows are unoccupied and when said seats of said respective one of said rows are occupied by passengers sitting therein; and wherein each one of said seat row indicators is respectively arranged at an area of a respective one of said aisle seats between said seat back upper edge and said seat back side flank of said respective one of said aisle seats, and is integrated smoothly and flushly into a contour of said respective one of said aisle seats at said area.

5. The passenger seating arrangement according to claim 4, wherein said respective row identifier of each respective one of said rows is a respective row number, and wherein said respective seat location identifier of each respective one of said seats in a respective one of said rows is a respective seat identifying letter.

6. The passenger seating arrangement according to claim 5, wherein each said respective seat row indicator includes first visual indicia that visually indicate a respective one of said row numbers and each said respective seat location indicator includes second visual indicia that visually indicate a respective one of said seat identifying letters.

7. The passenger seating arrangement according to claim 6, wherein each said respective row number is larger than each said seat identifying letter.

8. The passenger seating arrangement according to claim 6, wherein each said seat row indicator further includes respective tactile indicia providing a tactile representation of said respective row number, and each said seat location indicator further includes respective tactile indicia providing a tactile representation of said respective seat identifying letter.

9. The passenger seating arrangement according to claim 6, wherein each said respective seat row indicator includes a first set of said first visual indicia facing generally forwardly along said aisle and a second set of said first visual indicia facing generally rearwardly along said aisle.

10. The passenger seating arrangement according to claim 9, wherein each said respective seat row indicator further includes a third set of said first visual indicia facing generally laterally toward a center line of said aisle.

11. The passenger seating arrangement according to claim 4, wherein each one of said seat row indicators respectively comprises a mounting element permanently secured to a respective one of said aisle seats at said area thereof, and a cap releasably secured to said mounting element, wherein said respective row identifier is provided on or in said cap, and wherein said cap forms the outermost protrusion at said area.

12. The passenger seating arrangement according to claim 4, wherein each one of said seat location indicators is respectively arranged on a top surface of said seat back upper edge of a respective one of said seats.

13. A passenger seating arrangement in a passenger seating cabin of an aircraft, comprising:
   an aisle in said cabin;
   plural passenger seats arranged side-by-side next to one another on a respective side of said aisle, respectively in each one of plural successive rows of said seats along said aisle, wherein said seats in each one of said rows respectively include at least one aisle seat that is adjacent to said aisle, and wherein each one of said seats respectively includes a seat back bounded by a seat back upper edge and two seat back side flanks;
   seat row indicators that respectively indicate a respective row identifier of each respective one of said successive rows of said seats, and that are each respectively arranged on a respective one of said seat back side flanks of said aisle seats that face said aisle; and
   seat location indicators that respectively indicate a respective seat location identifier of each respective one of said seats in a respective one of said rows, and that are each respectively arranged directly on a respective one of said seats;
   wherein said seat row indicators and said seat location indicators are positioned so that said seat row indicator and said seat location indicators arranged on said seats of any respective one of said rows are directly visible and unobstructed in a direct line of sight of a person standing or walking in said aisle adjacent to said respective one of said rows of said seats, both when said seats of said respective one of said rows are unoccupied and when said seats of said respective one of said rows are occupied by passengers sitting therein;
   wherein each one of said seat location indicators is respectively arranged on a top surface of said seat back upper edge of a respective one of said seats; and
   wherein each one of said seat location indicators respectively comprises a mounting base permanently secured onto a respective one of said seats at said seat back upper edge thereof, and an identification cap releasably secured to said mounting base, wherein said respective seat location identifier is provided on or in said identification cap.

14. A passenger seating arrangement in a passenger seating cabin of an aircraft, comprising:
   an aisle in said cabin;
   plural passenger seats arranged side-by-side next to one another on a respective side of said aisle, respectively in each one of plural successive rows of said seats along said aisle, wherein said seats in each one of said rows respectively include at least one aisle seat that is adjacent to said aisle, and wherein each one of said seats respectively includes a seat back bounded by a seat back upper edge and two seat back side flanks;
   seat row indicators that respectively indicate a respective row identifier of each respective one of said successive rows of said seats, and that are each respectively arranged on a respective one of said seat back side flanks of said aisle seats that face said aisle; and
   seat location indicators that respectively indicate a respective seat location identifier of each respective one of said seats in a respective one of said rows, and that are each respectively arranged directly on a respective one of said seats;
   wherein said seat row indicators and said seat location indicators are positioned so that said seat row indicator and said seat location indicators arranged on said seats of any respective one of said rows are directly visible and unobstructed in a direct line of sight of a person standing or walking in said aisle adjacent to said respective one of said rows of said seats, both when said seats of said respective one of said rows are unoccupied and when said seats of said respective one of said rows are occupied by passengers sitting therein;
   wherein each one of said seat location indicators is respectively arranged on a top surface of said seat back upper edge of a respective one of said seats; and
   wherein each one of said seat location indicators protrudes smoothly upward from said top surface of said seat back upper edge of a respective one of said seats.

15. The passenger seating arrangement according to claim 14, wherein each one of said seats further includes a tiltable tray table that is tiltably mounted relative to said seat back, and wherein each one of said seat location indicators respectively includes a catch element that selectively engages and holds a respective one of said tray tables in an upright tilted position.

16. A passenger seating arrangement in a passenger seating cabin of an aircraft, comprising:
   an aisle in said cabin;
   plural passenger seats arranged side-by-side next to one another on a respective side of said aisle, respectively in each one of plural successive rows of said seats along said aisle, wherein said seats in each one of said rows respectively include at least one aisle seat that is adjacent to said aisle, and wherein each one of said seats respectively includes a seat back bounded by a seat back upper edge and two seat back side flanks;
   seat row indicators that respectively indicate a respective row identifier of each respective one of said successive rows of said seats, and that are each respectively arranged on a respective one of said seat back side flanks of said aisle seats that face said aisle; and
   seat location indicators that respectively indicate a respective seat location identifier of each respective one of said seats in a respective one of said rows, and that are each respectively arranged directly on a respective one of said seats;
   wherein said seat row indicators and said seat location indicators are positioned so that said seat row indicator and said seat location indicators arranged on said seats of any respective one of said rows are directly visible and unobstructed in a direct line of sight of a person standing or walking in said aisle adjacent to said respective one of said rows of said seats, both when said seats of said respective one of said rows are unoccupied and when said seats of said respective one of said rows are occupied by passengers sitting therein;

wherein each one of said seat location indicators is respectively arranged on said seat back upper edge of a respective one of said seats;

wherein each respective one of said seats further includes a respective removable head cushion protective cover; and wherein said head cushion protective cover has a hole therein which is arranged over said seat location indicator on said seat back upper edge of said respective one of said seats so as to locate and hold said head cushion protective cover on said respective one of said seats.

17. A passenger seating arrangement in a passenger seating cabin of an aircraft, comprising:

an aisle in said cabin;

plural passenger seats arranged side-by-side next to one another on a respective side of said aisle, respectively in each one of plural successive rows of said seats along said aisle, wherein said seats in each one of said rows respectively include at least one aisle seat that is adjacent to said aisle, and wherein each one of said seats respectively includes a seat back bounded by a seat back upper edge and two seat back side flanks;

seat row indicators that respectively indicate a respective row identifier of each respective one of said successive rows of said seats, and that are each respectively arranged on a respective one of said seat back side flanks of said aisle seats that face said aisle; and seat location indicators that respectively indicate a respective seat location identifier of each respective one of said seats in a respective one of said rows, and that are each respectively arranged directly on a respective one of said seats;

wherein said seat row indicators and said seat location indicators are positioned so that said seat row indicator and said seat location indicators arranged on said seats of any respective one of said rows are directly visible and unobstructed in a direct line of sight of a person standing or walking in said aisle adjacent to said respective one of said rows of said seats, both when said seats of said respective one of said rows are unoccupied and when said seats of said respective one of said rows are occupied by passengers sitting therein;

wherein said passenger seating cabin does not include any overhead indicia that identify a respective row identifier of said seat rows or a respective seat location identifier of said seats at a position higher than said seat back upper edges.

18. The passenger seating arrangement according to claim 17 wherein said seat row indicators and said seat location indicators respectively include light emitting elements that selectively illuminate said seat row indicators and said seat location indicators.

19. The passenger seating arrangement according to claim 18 wherein said light emitting elements comprise electroluminescent films.

* * * * *